United States Patent
Ellenby et al.

(10) Patent No.: US 6,690,370 B2
(45) Date of Patent: Feb. 10, 2004

(54) VISION SYSTEM COMPUTER MODELING APPARATUS INCLUDING INTERACTION WITH REAL SCENES WITH RESPECT TO PERSPECTIVE AND SPATIAL RELATIONSHIP AS MEASURED IN REAL-TIME

(75) Inventors: John Ellenby, San Francisco, CA (US); Thomas Ellenby, San Francisco, CA (US); Peter Ellenby, San Francisco, CA (US)

(73) Assignee: GeoVector Corp., San Francisco, CA (US)

( * ) Notice: Subject to any disclaimer, the term of this patent is extended or adjusted under 35 U.S.C. 154(b) by 0 days.

(21) Appl. No.: 10/350,386

(22) Filed: Jan. 23, 2003

(65) Prior Publication Data

US 2003/0132935 A1 Jul. 17, 2003

Related U.S. Application Data

(63) Continuation of application No. 08/482,944, filed on Jun. 7, 1995, now Pat. No. 6,535,210.

(51) Int. Cl.[7] .............................................. G06T 15/00
(52) U.S. Cl. ..................................................... 345/419
(58) Field of Search ................................. 345/419, 420, 345/619, 629; 701/207, 208, 211, 212

(56) References Cited

U.S. PATENT DOCUMENTS

| 2,994,971 A | 8/1961 | Meisenheimer et al. ..... 364/200 |
|---|---|---|
| 3,729,315 A | 4/1973 | Conklin et al. ............. 364/200 |
| 3,769,894 A | 11/1973 | Conklin ....................... 364/900 |
| 3,923,370 A | 12/1975 | Mostrom ..................... 364/900 |
| RE28,847 E | 6/1976 | Vizenor ....................... 364/200 |
| 3,990,296 A | 11/1976 | Erikson ....................... 364/200 |
| 4,322,726 A | 3/1982 | Collier et al. ............... 340/705 |
| 4,380,024 A | 4/1983 | Olofsson ...................... 358/93 |
| 4,425,581 A | 1/1984 | Schweppe et al. .......... 358/148 |
| 4,439,755 A | 3/1984 | La Russa ..................... 340/980 |
| 4,489,389 A | 12/1984 | Beckwith et al. ........... 364/522 |
| 4,572,203 A | 2/1986 | Feinstein ..................... 128/661 |
| 4,600,200 A | 7/1986 | Oka et al. .................... 273/313 |
| 4,645,459 A | 2/1987 | Graf et al. .................... 434/43 |
| 4,662,635 A | 5/1987 | Enokian ....................... 273/94 |
| 4,684,990 A | 8/1987 | Oxley .......................... 358/183 |
| 4,710,873 A | 12/1987 | Breslow et al. ............. 364/410 |
| 4,736,306 A | 4/1988 | Christensen et al. ........ 364/513 |
| 4,805,121 A | 2/1989 | Scott et al. .................. 364/522 |
| 4,807,158 A | 2/1989 | Blanton et al. .............. 364/521 |
| 4,835,532 A | 5/1989 | Fant ............................ 340/728 |
| 4,855,822 A | 8/1989 | Narendra et al. ........... 358/103 |
| 4,894,922 A | 1/1990 | Lovelock ...................... 33/272 |
| 4,939,661 A | 7/1990 | Barker et al. ................ 364/443 |
| 4,940,972 A | 7/1990 | Mouchot et al. ............ 340/747 |
| 4,947,323 A | 8/1990 | Smith .......................... 364/999 |
| 4,970,666 A | 11/1990 | Welsh et al. ................. 364/522 |
| 4,992,866 A | 2/1991 | Morgan ....................... 358/108 |
| 5,020,902 A | 6/1991 | Kits van Ieyningen et al. ............................ 356/21 |
| 5,034,812 A | 7/1991 | Rawlings .................... 358/108 |
| 5,072,218 A | 12/1991 | Spero et al. ................. 340/980 |
| 5,115,398 A | 5/1992 | DeJong ....................... 364/443 |
| 5,124,915 A | 6/1992 | Krenzel ....................... 364/420 |
| 5,182,641 A | 1/1993 | Diner et al. ................. 358/103 |
| 5,189,630 A | 2/1993 | Barstow et al. ............. 364/514 |
| 5,252,950 A | 10/1993 | Saunders et al. ........... 340/705 |
| 5,269,065 A | 12/1993 | Ida .............................. 33/264 |
| 5,296,854 A | 3/1994 | Hamilton et al. ........... 340/980 |
| 5,311,203 A | 5/1994 | Norton ........................... 345/7 |

(List continued on next page.)

Primary Examiner—Phu K. Nguyen

(57) ABSTRACT

Vision systems for use in modeling an environment or scene are presented. A user views a scene through an electronic camera and is presented with CAD type functionality for creating graphical representation of the addressed scene. The apparatus having knowledge of where it is with respect to objects being addressed and with respect to where it has been previously, the model perspective and size can be continuously updated to reflect the presend view of the scene in real time as the camera addresses from any point in space.

13 Claims, 14 Drawing Sheets

U.S. PATENT DOCUMENTS

| | | | |
|---|---|---|---|
| 5,320,351 A | 6/1994 | Suzuki | 273/86 |
| 5,322,441 A | 6/1994 | Lewis et al. | 434/307 |
| 5,333,874 A | 8/1994 | Arnold et al. | 273/185 |
| 5,342,051 A | 8/1994 | Rankin et al. | 273/999 |
| 5,353,134 A | 10/1994 | Michel et al. | 359/52 |
| 5,354,063 A | 10/1994 | Curchod | 273/999 |
| 5,367,578 A | 11/1994 | Golem et al. | 382/12 |
| 5,394,517 A | 2/1995 | Kalawsky | 395/129 |
| 5,410,649 A | 4/1995 | Gove | 395/161 |
| 5,454,043 A | 9/1995 | Freeman | 382/1 |
| 5,455,689 A | 10/1995 | Taylor et al. | 358/450 |
| 5,457,447 A | 10/1995 | Ghaem et al. | 340/825.54 |
| 5,462,275 A | 10/1995 | Lowe et al. | 273/94 |
| 5,467,444 A | 11/1995 | Kawamura et al. | 395/141 |
| 5,479,597 A | 12/1995 | Fellous | 395/154 |
| 5,528,232 A | 6/1996 | Verma et al. | 340/825.54 |
| 5,528,518 A | 6/1996 | Bradshaw et al. | 364/561 |
| 5,553,864 A | 9/1996 | Sitrick | 273/439 |
| 5,625,765 A | 4/1997 | Ellenby et al. | 395/135 |
| 5,682,332 A | 10/1997 | Ellenby et al. | 364/559 |
| 5,696,837 A | 12/1997 | Green | 382/128 |
| 5,703,961 A | 12/1997 | Rogina et al. | 356/437 |
| 5,742,521 A | 4/1998 | Ellenby et al. | 364/550 |
| 5,796,386 A | 8/1998 | Lipscomb et al. | 345/156 |
| 5,801,704 A | 9/1998 | Oohara et al. | 345/358 |
| 5,825,480 A | 10/1998 | Udagawa | 356/138 |
| 5,870,741 A | 2/1999 | Kawabe et al. | 707/5 |
| 5,902,347 A | 5/1999 | Backman et al. | 701/200 |
| 5,929,848 A | 7/1999 | Albukerk et al. | 345/326 |
| 6,442,476 B1 * | 8/2002 | Poropat | 701/207 |
| 6,549,639 B1 * | 4/2003 | Genest | 382/100 |

* cited by examiner

VISION SYSTEM COMPUTER MODELING APPARATUS INCLUDING INTERACTION WITH REAL SCENES WITH RESPECT TO PERSPECTIVE AND SPATIAL RELATIONSHIP AS MEASURED IN REAL-TIME

This is a continuation of application Ser. No. 08/482,944, filed Jun. 7, 1995, now U.S. Pat. No. 6,535,210.

BACKGROUND OF THE INVENTION

This application continues from U.S. application Ser. No. 08/482,944, filed Jun. 7, 1995, presently pending. These inventions are generally concerned with computer vision systems and specifically concerned with computer vision systems combined with computer aided design facilities.

The following disclosure is presented with the assumption that elements of computer aided design are well known to the reader. Texts explaining the current state of that are available from various sources, but those relating to AutoCad® may be particularly helpful. No attempt is made here to explain the details of implementing computer models with software except as it relates to the new arraignment presented.

Vision systems which combine electronic cameras with computers to perform image functions are described in various texts including co-pending patent applications of the present inventors having series 08 Ser. Nos.: 119,360; 270,911; 355,710; 335,940; 335,912; 411,299; 307,360.

It should be understood that all of the herein referenced provide considerable definition of elements of the present invention. Therefore, those materials are incorporated herein by reference whereby the instant specification can rely upon them for enablement of the particular teachings of each.

Computer aided design and modeling techniques are useful in various fields. Commonly referred to as CAD or computer aided design, an electronic computer can be used to model devices, objects or environments. Changes to the model are easily made and a great number of variations might be tried before arriving at a final desired result. Examples of uses of CAD include: by architects for buildings proposed to be built, or by automobile designers for cars proposed to be manufactured. A designer may start from a conceptual idea, a photograph, an artist drawing or other medium. From that initial idea or representation, a designer may construct on a computer, a model. A model consists of a plurality of individual graphical objects each having some correspondence to some real object. A photograph suggests to the CAD designer how particular features of the subject may look and give hints to how they might be implemented in a graphical representation. With advanced computers, it is even possible for the photograph to be scanned into an electronic image and combined with the CAD drawing, thereby facilitating formulation of a more accurate model. Converting real world objects into a computer model is of great interest to CAD designers as it provides very sophisticated designs in early stages of development.

Novel techniques have been discovered which provide very specialized uses of vision systems, and in particular as they may relate to computer aided modeling and design. While the systems and inventions of the prior art are designed to achieve particular goals and objectives, some of those being no less than remarkable, these inventions have limitations which prevent their use in new ways now possible. These prior art inventions are not used and cannot be used to realize the advantages and objectives of the present invention.

SUMMARY OF THE INVENTION

It is now first presented here, inventions of vision system computer modeling apparatus including devices for creating computer models of real scenes. It is a primary function of these systems to provide means and method for computer modeling or real objects. It is a contrast to prior methods and devices that known systems do not interact with real scenes with respect to perspective and spatial relationships as measured in real-time. A fundamental difference between the computer modeling apparatus of these instant inventions and those of the art can be found when considering its interaction and spatial relationships with respect to scenes being modeled.

An electronic imaging system combined with a computer aided design system and in communication with position, attitude, and optionally range measuring devices forms vision system computer modeling apparatus of these inventions. These vision system computer modeling apparatus are operable for addressing real scenes from some user chosen point-of-view, or perspective. The model presented at a display as a two-dimensional image has associated therewith a perspective which relates to a perspective of the three-dimensional real scene being modeled. The model as presented to a user is continuously responsive to changes in perspective. When the imaging system is moved such that the perspective of the scene changes, the perspective of the model similarly and correspondingly changes as well. This is accomplished via measurements of position and attitude of the apparatus with respect to the scene being addressed.

Tools and principles of computer aided design can be combined with real time continuous imaging systems to result in sophisticated modeling instruments. As it is readily possible to measure spatial information including position, attitude and range of the imaging system with respect to scenes being modeled, these data can be used to better create advanced models with great accuracy with respect to the real world.

For illustration by example, the combination of a computer running CAD software; a camcorder electronic camera; and position and attitude measuring apparatus forms the foundation of these systems.

Using such a system, a model designer may view a scene in real time and construct a model of the scene as it is viewed. Computer graphical objects can be created and associated with attributes of the real scene. In particular, the graphic objects and their nodes can be indexed to the real position and orientation of objects and features of objects they represent. As the camera is moved about the scene, i.e. to a new perspective, so can the appearance and perspective of the graphical objects in the computer model in a fashion which corresponds to the way real objects would be imaged from the new camera position. By combining computer aided design with real time electronic cameras and position, attitude and range measuring systems, a novel and powerful modeling system is realized.

These inventions thus stand in contrast to methods and devices known previously. The invention is a computer modeling apparatus with live real-time images and position and attitude measurement devices which relate the computer model to the scene being modeled in proper perspective for all relative positions of the apparatus with respect to the scene. Presently CAD systems are typically computer workstations with the ability to scan photographs and other graphics which may relate to a scene being modeled. The position and orientation of the workstation has nothing to do with the models residing within the computer.

It is a primary object of the invention to provide vision system computer modeling apparatus.

It is additionally an object of the invention to provide computer aided design apparatus whose models are responsive to the position and attitude of the apparatus with respect to the scene being modeled.

It is an object of the invention to provide apparatus comprising the combination of a computer aided design system, an electronic camera, position and attitude measuring apparatus and optionally, ranging apparatus.

A better understanding can be had with reference to the detailed description of Preferred Embodiments and with reference to the appended drawings. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternate versions are possible.

BRIEF DESCRIPTION OF THE DRAWINGS

These and other features, aspects, and advantages of the present invention will become better understood with regard to the following description, appended claims and drawings where:

PREFERRED EMBODIMENTS OF THE INVENTION

In accordance with each of the preferred embodiments of these inventions, there are provided apparatus for creating a computer model of a scene where the model is responsive to the position and attitude of the apparatus. It will be appreciated that the apparatus of one preferred embodiment may be different than the apparatus of another embodiment. Many alternatives and versions may exist for various components of these systems. Adoption of certain variations can be made without deviation from the true spirit of the invention. The scope of the following disclosure should not be limited to the example elements chosen here for illustration. The scope of the invention is set forth by the appended claims. The following examples are considered by the inventors to be the best of many possible modes of executing these inventions.

To realize an apparatus of these inventions, one may combine: 1) a camera; 2) a computer, and 3) position and attitude measuring devices.

Real-time electronic digital video is available by way of common CCD type electronic cameras. Hand held camcorders can be battery powered and highly portable. They allow a user to view some real scene at a display device, for example a liquid crystal display device. In addition, they are particularly well suited for the present subject as the digital signal they produce is compatible with computer processing operations.

Computers use similar liquid crystal displays for user interface. The images computers generate therefore are compatible with presentation on those devices. Therefore the combination of electronic cameras and computers is facilitated by the common display format. Very advanced design software is now available having graphical modeling capabilities. CAD methodology permits graphical objects to be manipulated in a great plurality of ways so that they may represent real objects in a computer model. These present inventions therefore can most simply be described as the combination of a real-time electronic camera with a computer running CAD type modeling software.

A user may address some real scene by pointing the camera there towards from a fixed position. Where a computer is connected to the camera and is running CAD software, a user may create a model of the real scene as it is viewed.

A careful reader will realize that models created with such a system would necessarily be specific to a certain perspective. For this reason, the system computer is preferably arranged to be in communication with position and attitude determining devices. If the device is moved, then the perspective of the real scene necessarily changes. To account for this change in the model, the computer mathematically determines a new perspective for the objects of the model by applying rotation, scale, translation algorithms which are responsive to the camera's new position such that the perspective of the model continuously updates in accordance with the true perspective of the real scene.

Figure 1:
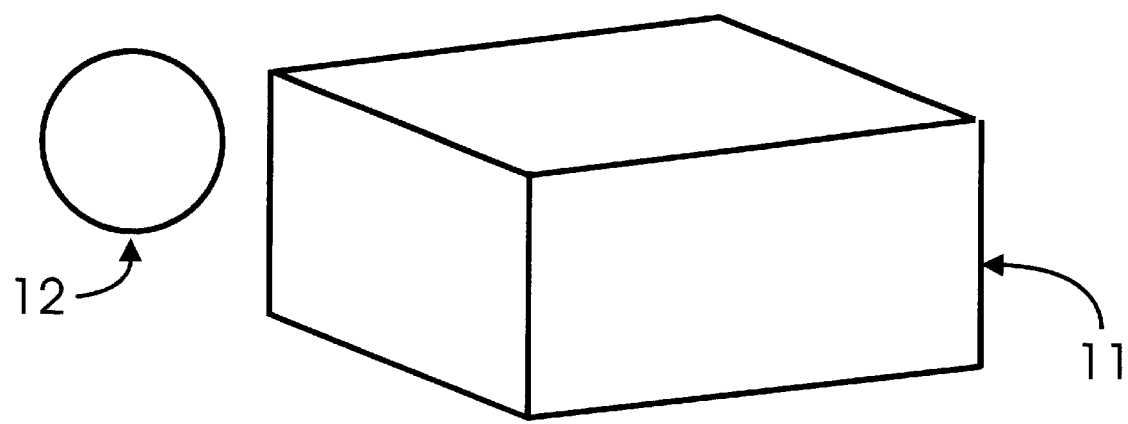
FIG. 1 is line drawing of objects having a certain spatial relationship.
Figure 2:
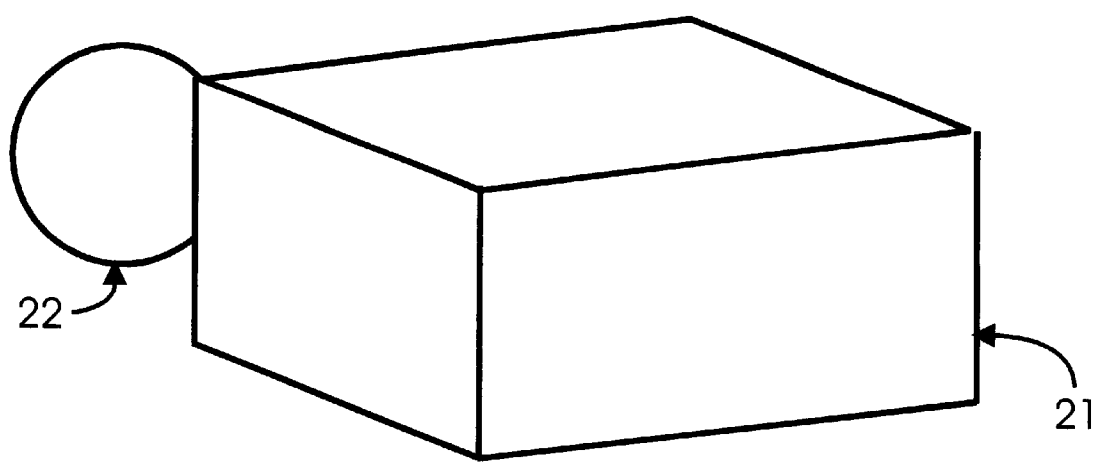
FIG. 2 is a different view of the same scene.
Figure 3:
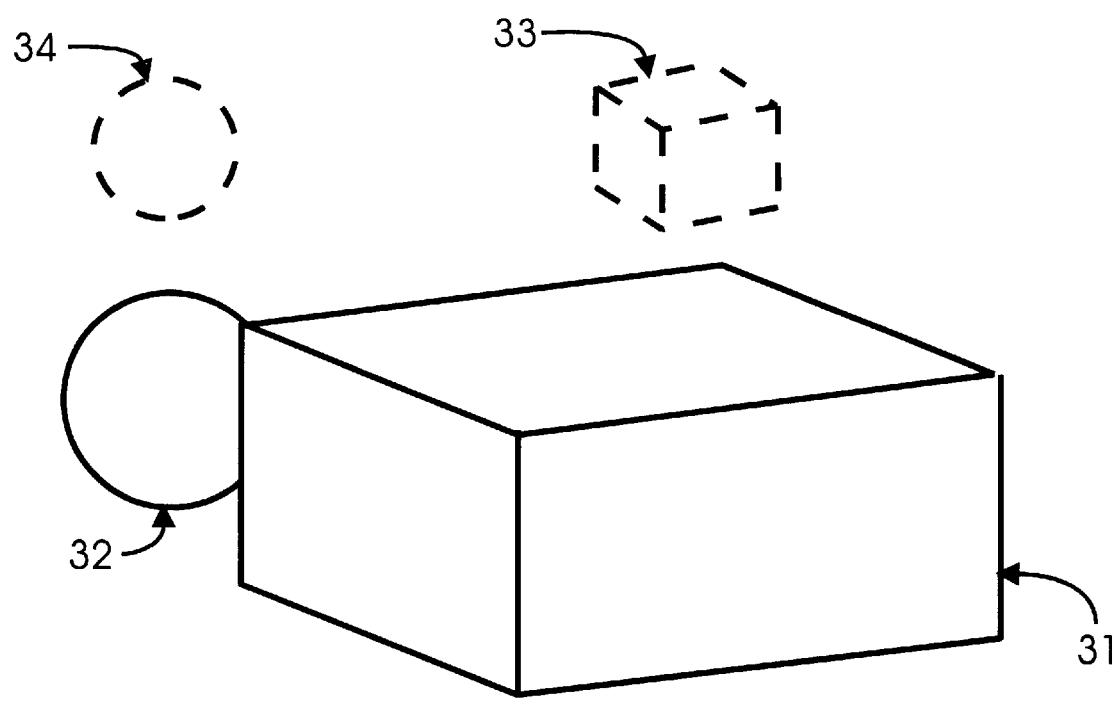
FIG. 3 shows a close-up and normal view at once.
Figure 4:
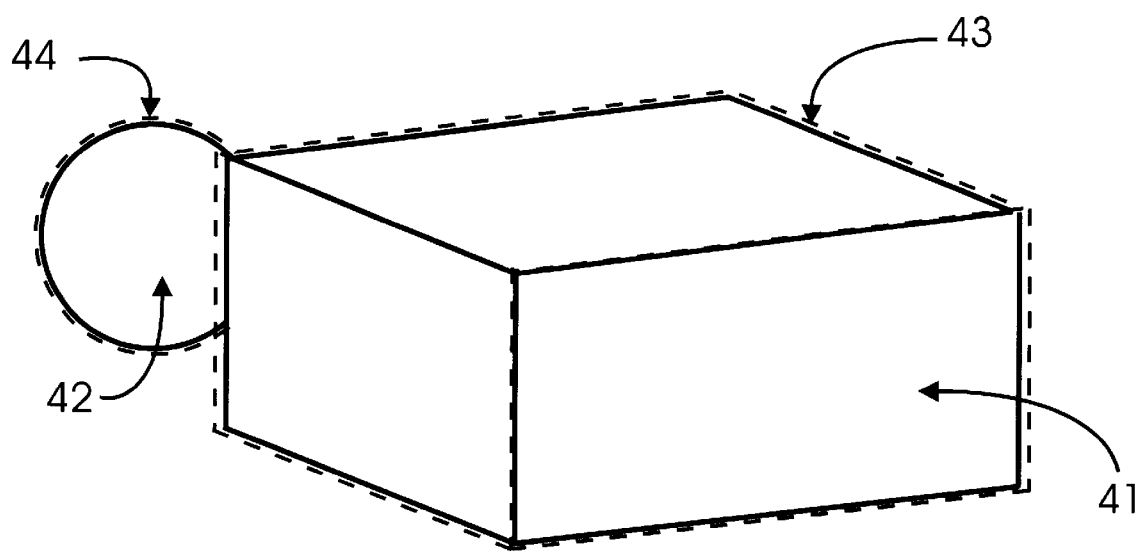
FIG. 4 shows a resizing operation.

For example, a camera is addressing a scene, FIG. 1, of a box (11) five meters in front of the camera and a ball (12) five meters further in the same direction. If the camera is moved toward the scene, FIG. 2, the objects in the foreground, the box (21), would appear in the display to increase in size at a greater rate than those in the background, the ball (22). Given sufficient views of the objects in question, the apparatus would have sufficient data to recall a model of a cube (33) and a sphere (34) to match to the box (31) and the ball (32). The recalled models would then be scaled and oriented by the user or the apparatus itself, and placed so that the models (43, 44) coincided with the real objects (41, 42) as is shown in FIG. 4.

For the computer to properly size the two objects it may be required to re-size "stretch" the objects, either manually or automatically via image recognition for example, to fit the new size of the corresponding real box and ball. After such manual re-sizing, the computer could estimate via a triangulation routine the relative positions with respect to the measured camera displacement. Additional camera displacements could result in automatic graphic object updates. The first re-sizing operation would calibrate the device and further adjustments may be calculated and the re-sizing of the model objects performed without further user input. Similarly, other perspective and depth features could be accounted for. Mathematical translations from a real world 3-D scene to a 2-D computer display are already very common. Many advanced computer routines have been developed to facilitate perspective representations of 3-D objects on a 2-D display. It is important to realize here that the invention does not propose any new perspective computation routines. The well developed routines known are sufficient. It is, however, a new combination of primary elements which result in the powerful modeling tool.

An alternate apparatus of the invention may comprise: 1) a camera; 2) a computer; 3) position and attitude measuring devices, and 4) a range finding device. The addition of a ranging capability enhances the ability of the apparatus to create three dimensional models of the scene being addressed. To calculate the position of a point in the scene, the user would range on the point of interest and the unit, given position and attitude data, could calculate the coordinates of the point directly. It is important to realize that the invention does not propose a new method of position calculation based on unit position and attitude, and range to object. This method has been in use, in radar directed gunnery for example, for many years, though not for developing of computer graphical models. What is important is that range based position calculation enables the user to quickly develop a model based on nodes and connecting lines and curves, much as in CAD type programs. Also, range based position calculation enables the unit to use advanced modeling methods based on image processing such as edge detection within a defined area and coplanar modeling.

Figure 9:
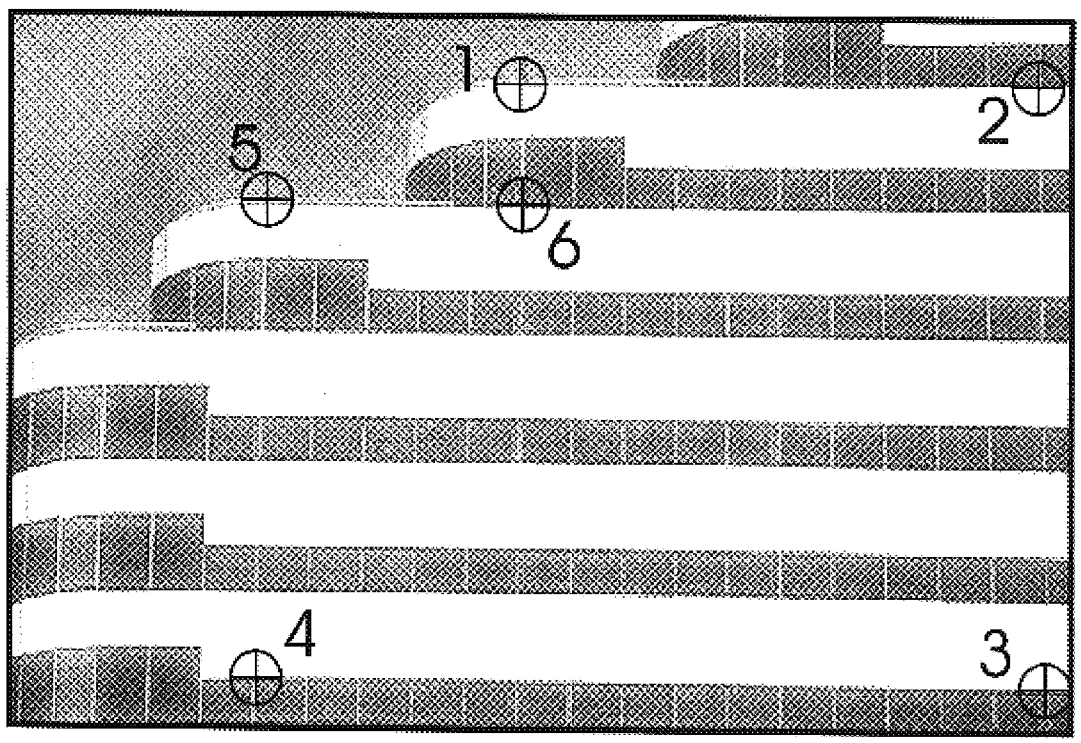
FIGS. 9, 10, 11, and 12 show the side of a building being modeled.
Figure 10:
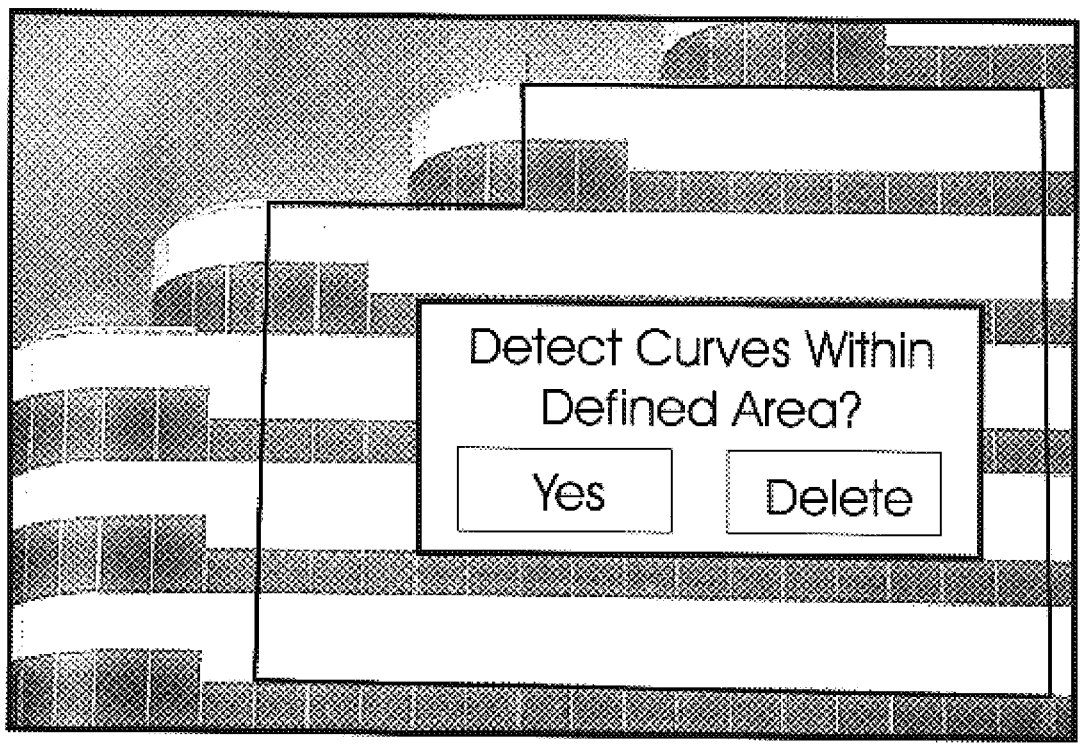
Figure 11:
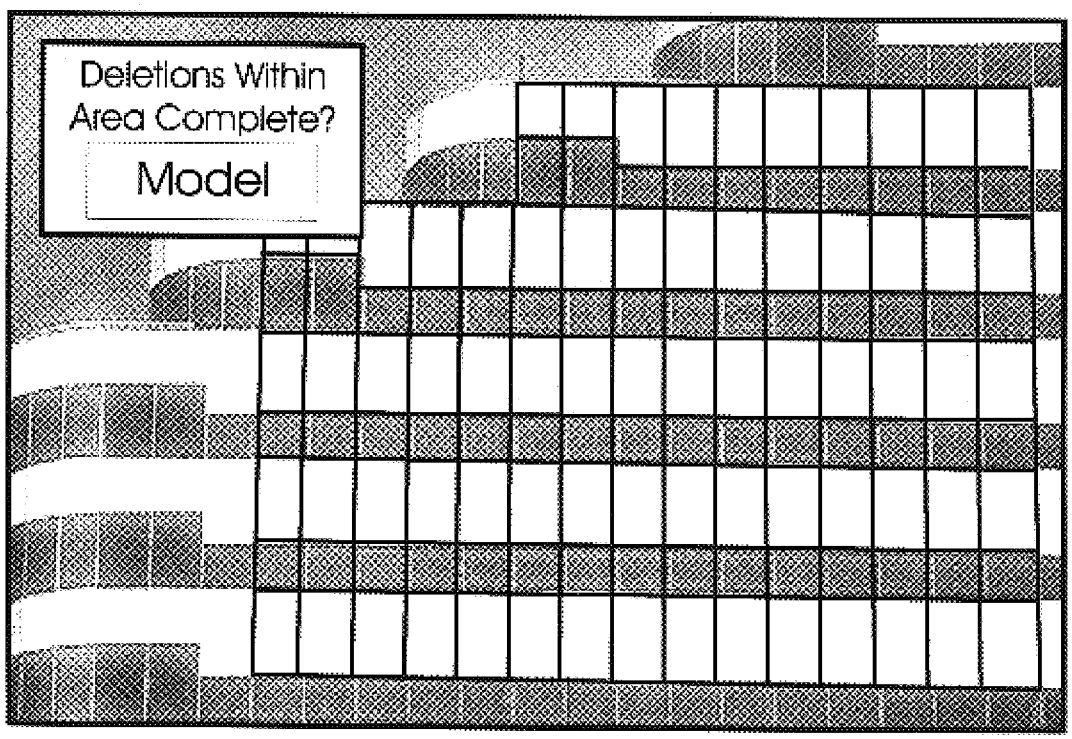
Figure 12:
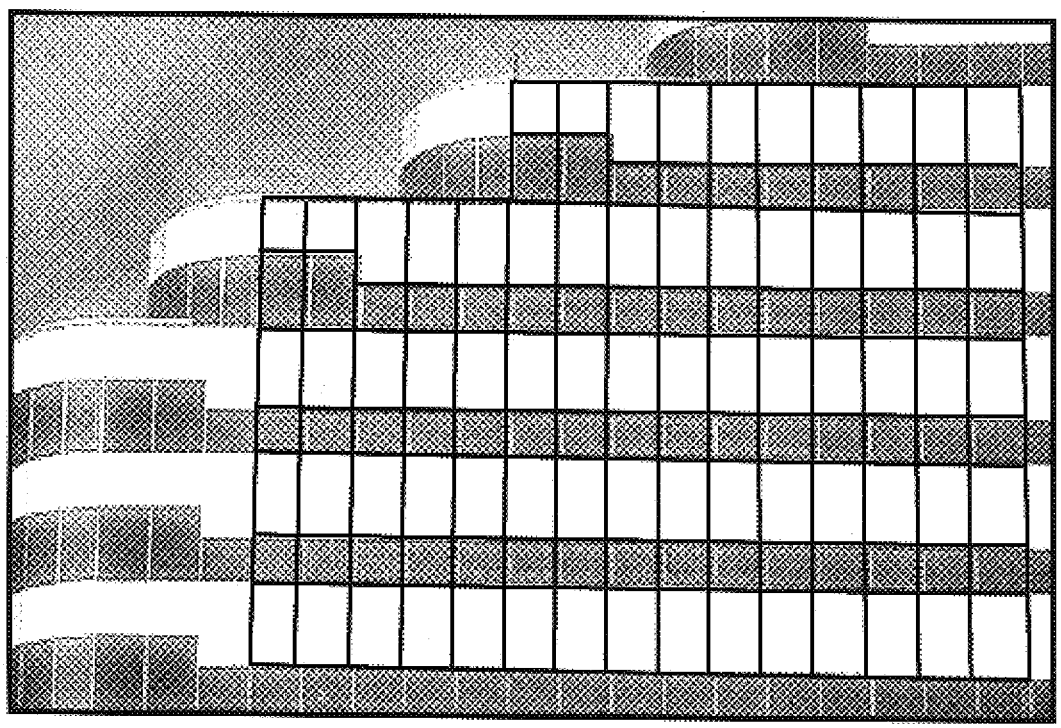
Figure 13:
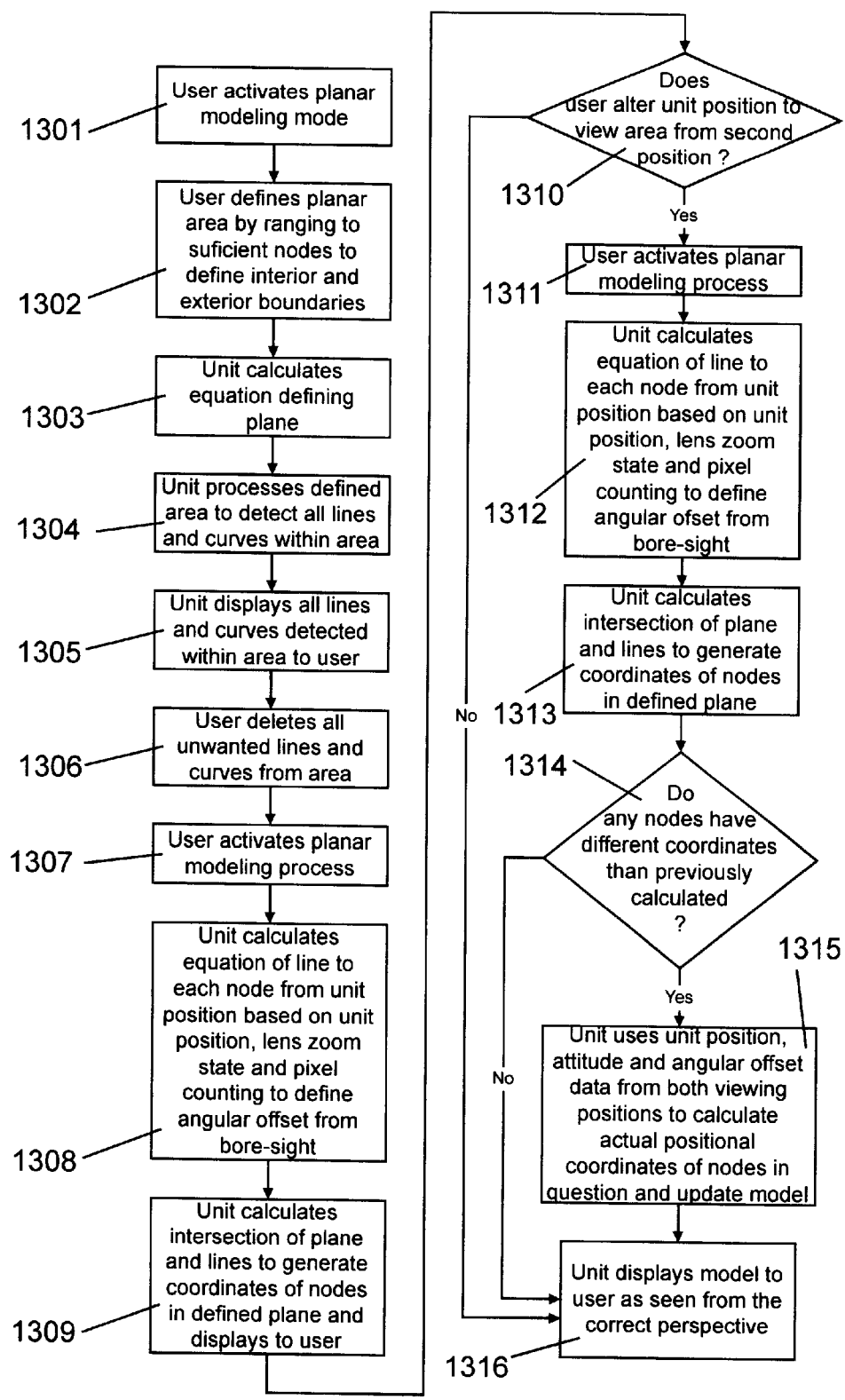
FIG. 13 is a flow diagram for a modeling method.
Figure 14:
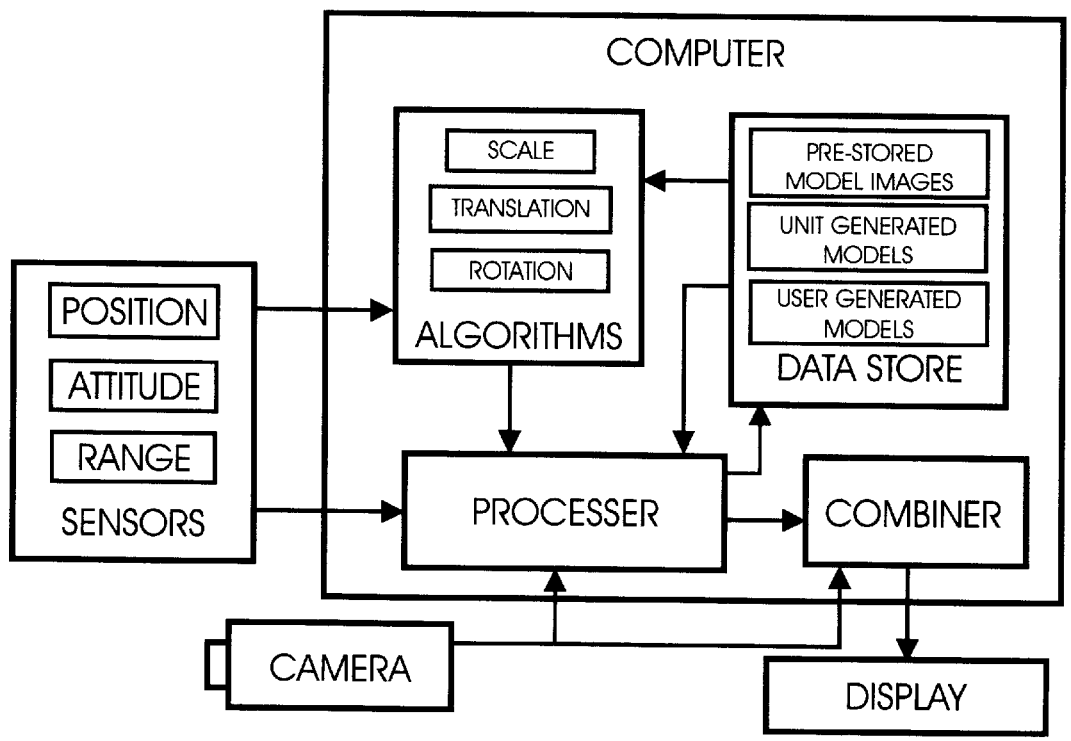
FIG. 14 is a system block diagram.

For example, a user of the apparatus may choose to use a method of coplanar modeling, FIG. 13. A user would range to sufficient points, at least three are required to define a plane but the user could define as many points as are needed to define the area of interest, to define the boundaries of a planar area 1302. These boundaries may or may not be part of the model. The user may also define areas within these edge boundaries that the unit is to ignore. In other words, the user may cut pieces out of the defined area that will not be analyzed by the unit, in effect setting up interior boundaries. This would enable the user to define exactly the area that is to be analyzed by the unit. Once the area has been defined the unit then calculated the equation defining the plane 1303. The unit then detects, using edge detection and other methods known, all lines and curves within the defined area 1304 and displays them to the user 1305. The user then deletes all lines that are not to be modeled 1306. By utilizing the knowledge of the location and orientation of the defined plane in relation to the units position, and the ability of the unit to measure angles from its bore-sight, by pixel counting and knowledge of lens zoom state, the unit can calculate the location of all of the nodes needed to define those lines and curves in the defined plane 1308, 1309. FIGS. 9–12 illustrate the basic steps involved in relation to modeling a wall of an office building. In FIG. 9, the user defines the planar area by ranging to vertexes 1–6. In FIG. 10 the user confirms the process by using an interactive graphical user interface. In FIG. 12 the unit displays the calculated model to the user.

Figure 5:
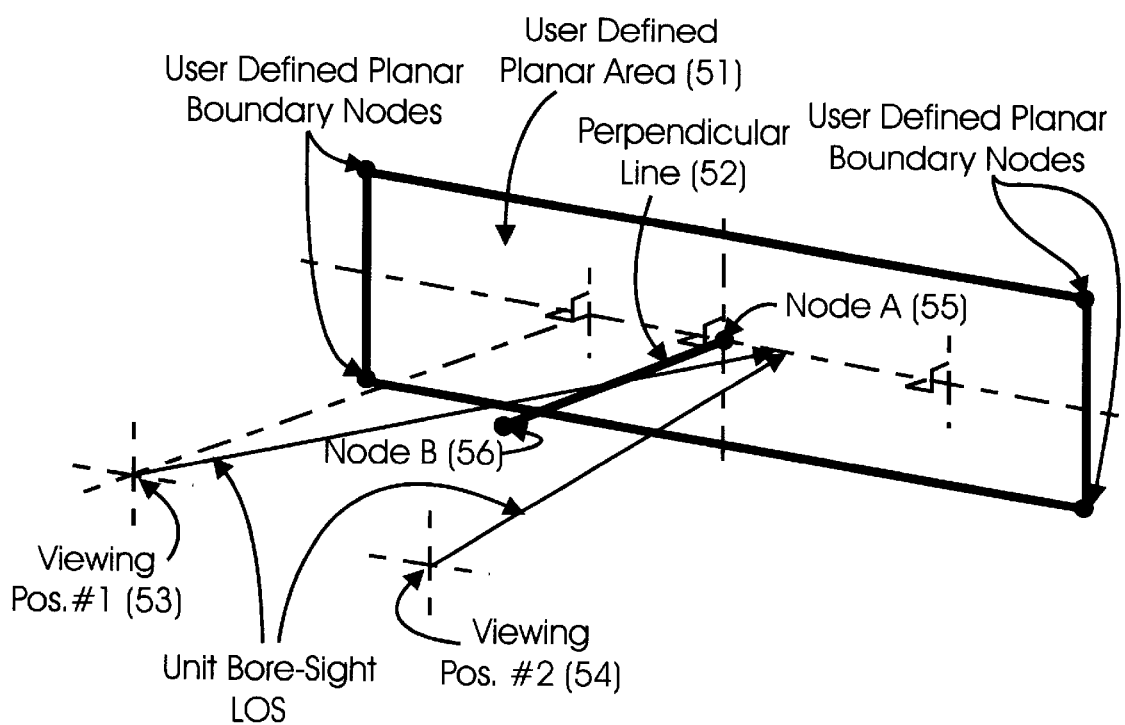
FIG. 5 shows a scene space geometry.
Figure 6:
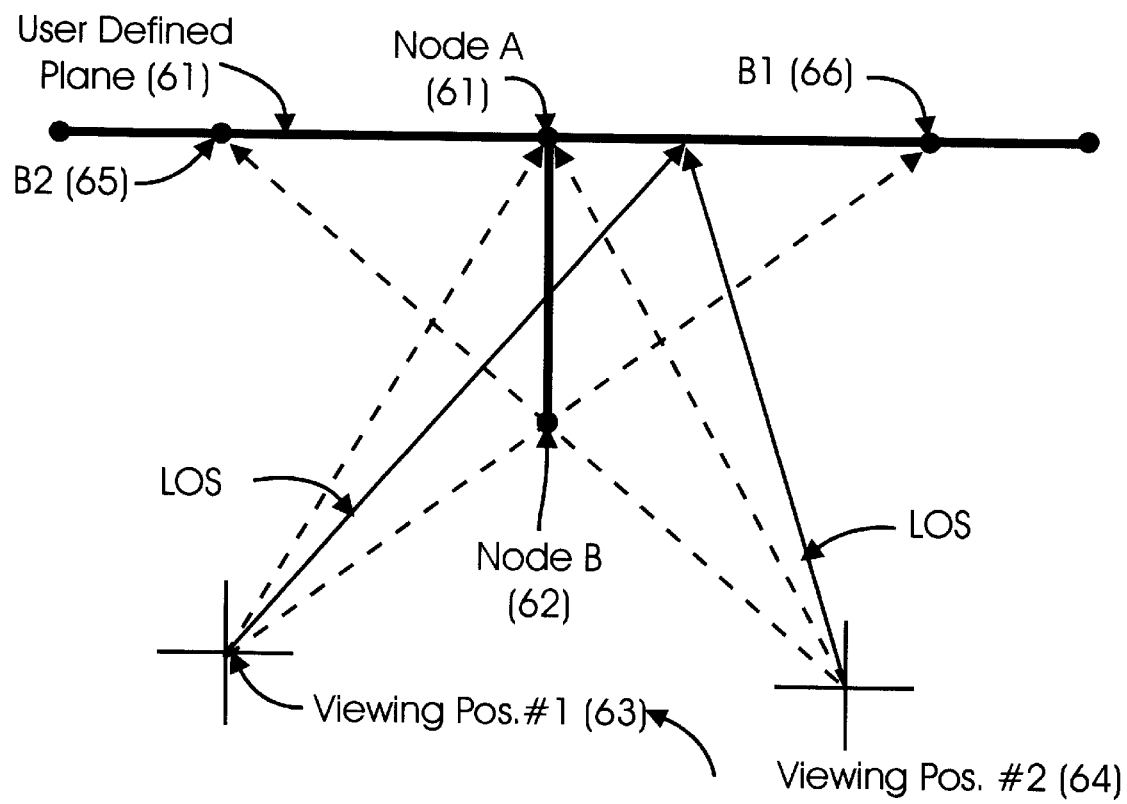
FIG. 6 shows a top view of that same geometry.
Figure 7:
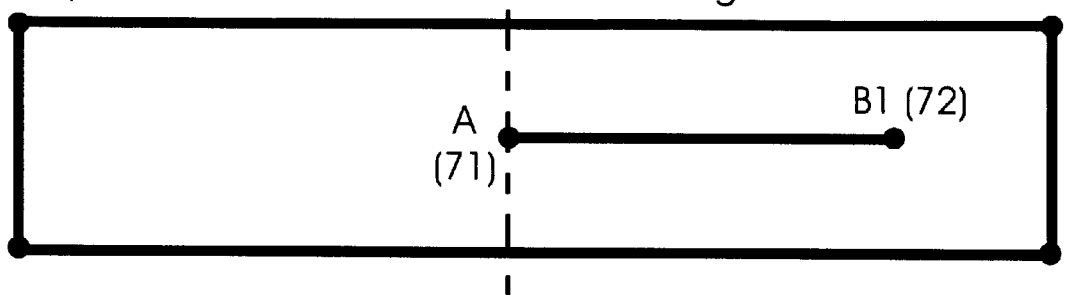
FIGS. 7 and 8 illustrate line elements generated from various positions.
Figure 8:
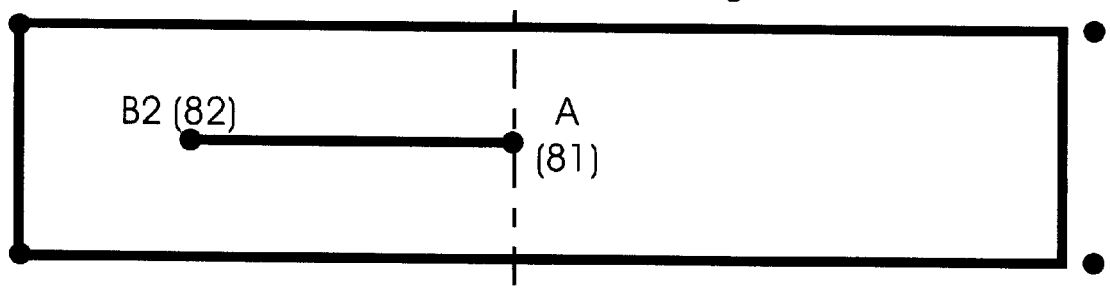

A continuation of the coplanar method would be to use a pair of planar models, created from different positions, using the same boundary limits. If any objects projected from, or were inset into, the plane the two images would appear different. The unit would be able to calculate, through triangulation, the correct coordinate for these nodes. Some situations may require a third view from another location for completeness. FIG. 5 shows a general situation in which a user defines a planar area 51 that has a line 52 sticking out of it at right angles. The viewer would go through the planar modeling process from viewing position #1 53 and from viewing position #2 54 to generate the coordinates for node A 55 within the plane and to calculate the coordinates of the endpoint, node B 56, without the user having to range to either point specifically. In this simple situation it would seem easier to just range on the two points in question, nodes A & B, and have done with it. But if the area contained many projections or indentations the user, by using this method, would merely have to define a planar area, and view it from several points of view, to model these projections in three dimensions. FIG. 6 gives a plan view of the situation and clearly shows that, if node B 62 is assumed to be in the defined planar area 61, that the coordinates calculated for the intersection of a line, from the two viewing positions 63,64 to node B 62, and the plane 61 will produce different coordinates, nodes B1 66 and B2 65. In the case of node A 61 the change in viewing position will not produce a change in coordinates because node A 61 is indeed in the defined plane. These coordinates, as calculated from each viewing position, are shown in FIGS. 7 and 8. These figures clearly shows that node A 71, 81 is within the plane. FIGS. 7 and 8 also show, through the discrepancies in the positions of modes BI 72 and B2 82, that the real position of node B is not within the defined plane. To calculate the actual coordinates of node B is quite simple. Given the knowledge of the location of each viewing position and the knowledge of the bearings, both horizontal and vertical, to the node, based on the pixel counting angular offset method, from each viewing position the unit could calculate the actual position of the node by triangulation.

The primary elements of the systems are:
  a camera to acquire a digital image of a real scene;
  a computer to run CAD type software and combine graphical objects with the real image, and further to compute perspective relationships between a real 3-D scene and a 2-D perspective of that scene, the computing routines being responsive to position, attitude and ranging measurements; and
  apparatus operable for measuring position, attitude, range.
More specifically:
  the camera may be a camcorder type, a portable battery operated device for producing a digital video signal, in communication with a computer processor;
  the computer may be the type known as a personal computer: having a microprocessor for example Pentium or Power PC processors which have been employed to execute code developed for computer modeling, further being operable for combining an image from an electronic camcorder with a computer generated graphical model image, further being in communication with and responsive to apparatus for measuring position, attitude and range of the camera.
The apparatus for measuring position, attitude and range may be as follows:
  the position measuring apparatus may be a large scale system such as the global position system G.P.S. or may be a local system arranged with a particular environment in mind such as a city block or single room of a building, each employing some radio location measures, depending upon desired accuracy, the choice of appropriate position measuring system will vary;
  the attitude measuring apparatus may be an electronic compass, flux gate compass, interferometer ring gyro or other device which is operable for measuring relative pointing direction of the camera imaging axis; and
  the ranging apparatus may be an ultrasonic or radar device which measures relative position of object by timing a test pulse which is reflected therefrom. Some of these devices are common to simple photographic cameras in auto-focus systems. Other types of ranging, such as laser or infrared rangefinders, may be equally effective as long as it is possible to determine the distance from the camera to a particular object and relay that measurement to the computer.

In a special version of the invention, the camera is omitted. A viewing path is defined by a reticule system which provides reference or "pointing" axis for the devices. In common CAD methods, "pointing" and "clicking" may be done via a mouse peripheral device. An icon, for example an arrow, designates a position on the model field as displayed on the screen. Objects of the model are manipulated by pointing and clicking, clicking and dropping, etc. The model may relate to some real scene, but is not generally responsive thereto.

In a particular version of the invention, pointing, clicking and dragging operations may be implemented by manipulation of a pointing axis into a real scene. Clicking is accomplished by a simple switch on the device sensitive to tactile manipulation. Again, the system's ability to know its position and pointing attitude as well as certain range data allows it to directly interface with the real world. The model is sensitive to and responsive to the position and attitude of device in the 3-D scene. The displayed model, therefore, corresponds to how the scene would look from any perspective.

Modeling methods of these inventions include methods having the primary steps as follows: viewing a scene with an electronic camera; measuring position and attitude of said camera; recording a first point associated with said measurements; changing either the position state or attitude state of the camera; recording at least one other point associated with the new position and attitude state; and displaying said points superimposed with an image captured with said electronic camera. In this way, one can see the scene while also viewing the model being formed together in the same perspective. The methods may also include a step where the points are connected together by line segments. Or, further by connecting several points to form a polygon computer model object. Such polygons may be shaded, colored, or textured by application of these attributes in the computer model databases.

Where a model of an object in a scene is formed from one point of view, the user may later go to a different point of view and repeat some or all of the points. From a second position, the points which are repeated may be averaged with the points acquired from the previous viewpoint to form a more accurate point definition.

Although the present invention has been described in considerable detail with clear and concise language and with reference to certain preferred versions thereof including the best modes anticipated by the inventor, other versions are possible. Therefore, the spirit and scope of the appended claims should not be limited by the description of the preferred versions contained therein.

What is claimed is:

1. Apparatus for creating computer models comprising:
   an electronic camera; position and attitude measurement apparatus; a display; and
   a computer operable for: running CAD software, acquiring images from said electronic camera, receiving position and attitude information relating to a present system position and attitude of said electronic camera, computing perspective adjustments, combining imagery from said electronic camera with imagery from said CAD software, displaying combined imagery at said display; said electronic camera, position and attitude measurement apparatus each in communication with said computer.

2. Apparatus of claim 1 further comprising: a range measurement apparatus, said computer further being operable for receiving range information relating to the distance between the apparatus and a point in the scene being addressed, said range measurement apparatus being in communication with said computer.

3. Apparatus of claim 1, said displaying combined imagery includes forming a composite image of the real scene with a computer model graphic superimposed thereon in proper perspective.

4. Apparatus of claim 1, the elements of said apparatus being integrated into a handheld mobile system.

5. Apparatus of claim 4, said position measurement apparatus being a GPS receiver.

6. Computer modeling apparatus comprised of:
   a computer in communication with each of the following:
      an electronic camera;
      a position determining means;
      an attitude determining means;
      a range determining means; and
      a display,
   said electronic camera having an imaging axis and an image plane, the imaging axis defining a system pointing direction, the intersection of the imaging axis and image plane defining a position reference point;
   said computer arranged to run CAD software in conjunction with software to communicate with said position, attitude and range determining means and said display;
   said position determining means arranged to determine the position of the reference point,
   said attitude determining means arranged to determine the system pointing direction,
   said range determining means arranged to determine the distance from the camera to a point on an object in a scene being addressed, and
   said display having a substantially planar image field with its normal direction aligned to the pointing direction.

7. A computer apparatus of claim 6, said computer including a computer software object model responsive to the position and attitude of the apparatus.

8. A computer apparatus of claim 7,
   said response being a translation of perspective whereby the perspective of the scene being addressed from the camera viewpoint corresponds to the perspective of the displayed model.

9. Computer modeling methods comprising the steps:
   viewing a scene with an electronic camera;
   measuring position and attitude of said camera;
   recording a first point associated with said measurements;
   changing either the position state or attitude state of the camera;
   recording at least one other point associated with the new position and attitude state; and
   displaying said points superimposed with an image captured with said electronic camera.

10. Computer modeling methods of claim 9, further comprising the steps forming a computer model be connecting a plurality of points with line segments.

11. Computer modeling methods of claim 9, further comprising the steps forming polygon objects which correspond to planar elements of a real scene.

12. Computer modeling methods of claim 11, further comprising the steps applying color and texture attributes to said polygons to form portions of an object model.

13. Computer modeling methods of claim 9, further comprising a step to re-acquire a previously defined from a new position to improve the accuracy by averaging.

* * * * *